United States Patent [19]

Suchy et al.

[11] Patent Number: 5,094,805
[45] Date of Patent: Mar. 10, 1992

[54] FUEL ASSEMBLY FOR A PRESSURIZED WATER REACTOR

[75] Inventors: Peter Suchy, Erlangen; Heinz-Peter Holley, Forchheim; Wolfgang Schricker, Schwaig, all of Fed. Rep. of Germany

[73] Assignee: Siemens Aktiengesellschaft, Munich, Fed. Rep. of Germany

[21] Appl. No.: 486,519

[22] Filed: Feb. 28, 1990

[51] Int. Cl.$^5$ .............................................. G21C 3/34
[52] U.S. Cl. ..................................... 376/438; 376/435
[58] Field of Search ................ 376/438, 428, 435, 449

[56] References Cited

U.S. PATENT DOCUMENTS

| | | | |
|---|---|---|---|
| 3,607,640 | 9/1971 | Krawiec | 376/442 |
| 4,057,466 | 11/1977 | Thompson et al. | 376/217 |
| 4,059,484 | 11/1977 | Bupp et al. | 376/435 |
| 4,708,845 | 11/1987 | Mildrum | 376/435 |
| 4,783,308 | 11/1988 | Taleyarkhan | 376/370 |

FOREIGN PATENT DOCUMENTS

| | | |
|---|---|---|
| 0196655 | 10/1986 | European Pat. Off. |
| 0199197 | 10/1986 | European Pat. Off. |
| 2258691 | 8/1975 | France |
| 1549344 | 11/1986 | France |

Primary Examiner—Brooks H. Hunt
Assistant Examiner—Meena Chelliah
Attorney, Agent, or Firm—Herbert L. Lerner; Laurence A. Greenberg

[57] ABSTRACT

A fuel assembly for a pressurized water reactor includes fuel assembly edges and a fuel assembly interior. A bundle of mutually parallel fuel rods with cladding tubes each contain nuclear fuel. A given number of guide tubes are provided for control rods. A support structure includes an upper end with a fuel assembly head, a lower end with a fuel assembly foot, and a plurality of spacers disposed perpendicular to the fuel rods. The spacers have a uniform grid structure with edge meshes formed therein at the fuel assembly edges and inner meshes formed therein in the fuel assembly interior. Each of the inner meshes are surrounded by four respective immediately adjacent meshes each having the same area and each containing a respective one of the guide or cladding tubes or an instrumentation tube. At least one of the four meshes immediately adjacent each given inner mesh with a guide tube, contains a fuel rod cladding tube with a periphery being closer to the guide tube than the fuel rod cladding tubes in the remainder of the four meshes. The cladding tube of the fuel rod in the at least one mesh immediately adjacent the given inner mesh with a guide tube, may have a larger outside diameter than a fuel rod in an edge mesh and/or it may have a central axis being closer to the guide tube than the center of the at least one mesh.

16 Claims, 5 Drawing Sheets

FUEL ASSEMBLY FOR A PRESSURIZED WATER REACTOR

The invention relates to a fuel assembly for a pressurized water nuclear reactor, having a bundle of parallel fuel rods each containing nuclear fuel in a cladding tube.

Fuel assemblies for pressurized water reactors usually are square in cross section. They contain a number (for instance 17×17) of closely adjacent fuel rods, which are disposed in a grid pattern in rows, are joined into a bundle and are surrounded by moderating water during operation. The pressurized water reactor is provided with a core that is made up of a number of such individually replaceable fuel assemblies disposed within one pressure boiler. Control rods are longitudinally movably guided in guide tubes of the fuel assemblies. Guide tubes can also be provided, which contain an additional moderator rod.

A relatively large number of fuel rods, guide tubes and as a rule one instrumentation tube form one bundle, which is combined into the fuel assembly by means of a support structure. The support structure has a fuel assembly head at the top, a fuel assembly foot at the bottom, and spacers with a grid-like structure each being disposed in one of a plurality of intermediate planes, with one fuel rod, guide rod or instrumentation tube being guided through each of the meshes in the spacer, so as to keep these rods and tubes in a desired position by means of suitable support devices (such as button and spring combinations).

In U.S. Pat. No. 4,059,484, a spacer is made up of square meshes that either all have a relatively small surface area or are combined in the interior of the bundle into islands with larger meshes, resulting in a non-uniform grid structure. The guide tubes and thicker fuel rods which have differently enriched nuclear fuel and are placed in suitably thick cladding tubes, are located in the larger meshes.

In the pressurized water reaction, certain moderator inconsistencies in fact occur because of structural reasons, specifically because of the heterogeneous radial distribution of the guide tubes and possibly an instrumentation tube and because of a water gap between adjacent fuel assemblies. The inconsistent local moderator distribution over the cross section of one fuel assembly leads to a correspondingly uneven local output generation. In the vicinity of the guide tubes, for instance, which are filled with the moderator (such as water), a higher local output generation occurs in comparison with the mean fuel assembly value. This results in a heterogeneous output generation from one fuel rod to the other and thus not only leads to uneven utilization of the nuclear fuel but also causes pronounced differences in fuel rod consumption, and in local fuel rod corrosion.

Published European Application No. 196,655 shows a pressurized water fuel assembly and a boiling water fuel assembly. The boiling water fuel assembly includes relatively few fuel rods, and is surrounded by a box or chest for hydrodynamic and mechanical reasons. Thin fuel rods are disposed in one corner of the box, and thicker fuel rods are relatively widely spaced apart in the interior of the box, while fuel rods of an average cross-sectional area are disposed at the remaining edge of the box with close spacing between one another. Such variably thick and unevenly distributed fuel rods do not fit in a grid-like spacer having square meshes of equal mesh area. As is generally the case in boiling water fuel assemblies, no guide tubes are provided.

The pressurized water fuel assembly of Published European Application No. 196,655 contains thicker and thinner fuel rods which fit into square meshes of a spacer having equal surface areas. Each of the guide tubes, which is distributed over the cross section of the fuel assembly, is surrounded by four thinner rods and forms a cross-shaped structure therewith. The fuel rods on the edge of the bundle also have a smaller cross section with equal spacing from center to center, while all of the other fuel rods are thicker.

Published European Application No. A 0 199 197 discloses a special fuel assembly for a boiling water reactor, in which some fuel rods are provided with a jacket of gadolinium, which is a neutron poison, and thus have a larger outside diameter than other fuel rods. However, in that configuration this is not done to even out the output density distribution but instead is dictated by the fact that the pellet clad with gadolinium must necessarily have a larger diameter for the same fuel content than conventional pellets. This is also due to the fact that although two water rods are shown in FIG. 2 of that reference, no provisions are shown or described for the output generation in the vicinity of the water rods.

The fuel assembly known from French Patent No. 1,549,344 likewise contains only a few fuel rods and no guide tubes, because it is intended for a boiling water reactor. The fuel rods are of equal thickness and are disposed in straight or curved rows in such a way that the spacing among the fuel rods increases toward the central axis of the fuel assembly.

Published French Application No. 2,258,691 shows a sodium nuclear reactor with a hexagonal fuel assembly having edge rods which are shifted toward the outside in order to increase the spacing from fuel rods located farther inward.

It is accordingly an object of the invention to provide a fuel assembly for a pressurized water reactor, which overcomes the hereinafore-mentioned disadvantages of the heretofore-known devices of this general type and which is improved in terms of the uneven local output generation. It is intended to provide an economically improved utilization of the fuel present in the core of the reactor, combined with a reduction in the maximal local thermal fuel rod load that arises, if this is at all possible without impairing the mechanical stability and functional ability (guide tubes, spacers, etc.) of the pressurized water fuel assembly.

With the foregoing and other objects in view there is provided, in accordance with the invention, a fuel assembly for a pressurized water reactor, comprising fuel assembly edges, and a fuel assembly interior, a bundle of mutually parallel fuel rods with cladding tubes each containing nuclear fuel, a given number of guide tubes for control rods, and optionally at least one instrumentation tube; a support structure including an upper end with a fuel assembly head, a lower end with a fuel assembly foot, and a plurality of spacers disposed perpendicular to the fuel rods, the spacers having a uniform grid structure with edge meshes formed therein at the fuel assembly edges and inner meshes formed therein in the fuel assembly interior, each of the inner meshes being surrounded by for respective immediately adjacent meshes each having essentially the same area and each containing a respective one of the guide or cladding or instrumentation tubes; and whereby, for each inner mesh containing a guide tube, at least one of said respective immediately adjacent meshes contains a fuel rod in which the spacing of the cladding tube periphery from said inner mesh is smaller than the corresponding spacing of the cladding tube periphery of a fuel rod contained in an edge mesh from an inner mesh. The cladding tube of the fuel rod in the at least one mesh immediately adjacent the given inner mesh with a guide tube, may have a larger outside diameter than a fuel rod in an edge mesh and/or it may have a central axis being closer to the guide tube than the center of the at least one mesh.

Therefore, the assembly contains spacers having square meshes of equal area, each receiving one fuel assembly or one guide tube (for instance an instrumentation tube, in the event that instrumentation tubes are provided in the interior of the bundle of fuel rods).

The positions of the fuel rods in the various meshes and the diameters thereof are selected as a function of the location of the various meshes relative to the edge of the bundle, the guide tubes, and the density of thermal neutrons prevailing there, in such a way that the most uniform possible output distribution over the cross section of the fuel assembly is established.

Due to the specified square structure of the equal-area meshes, one of the four broad sides of each mesh in the interior ("inner mesh") abuts the broad side of another mesh, which therefore directly adjoins the mesh. In contrast, a mesh at the edge of the bundle (or "edge mesh") has two edge meshes and at best only one further inner mesh directly adjoining it.

In terms of the spacing of the centers of the fuel rod or the outer diameter of the cladding tubes in the edge meshes, a reduction in the spacing between a guide tube and the fuel rods in the immediately adjacent inner meshes is virtually equivalent to an enlargement of the outer diameter of the cladding tube, since both leave the periphery of the fuel rod cladding tube closer to the guide tube than the fuel rod cladding tubes in the other meshes. In both cases, a disruption resulting from the disposition of a guide tube instead of a fuel rod in the corresponding mesh is largely neutralized.

Reducing the fuel rod to guide tube spacing is attained, despite the equal-area meshes, by providing that the central axis of the fuel rod is offset out of the middle or center point of the corresponding mesh in the direction toward the guide tube.

As a result, the spacing of the thus offset fuel rod with respect to fuel rods that are located in the middle of other immediately adjacent meshes also increases. With fuel rods of equal thickness, this increased fuel rod to fuel rod spacing therefore works like a reduction of the thickness of the other fuel rods, so that as a result, by means of a reduced thickness of the edge rods or an increased spacing from fuel rod to fuel rod between a given edge rod and a rod located farther inward, the same effect on the fuel rods located farther inward can be attained.

A larger cladding tube diameter further offers the opportunity of accommodating more fuel. However, for the sake of simple manufacture and storage, it is advantageous to provide the same diameter for all of the fuel rods, in the embodiment having an unequal fuel rod distribution or in other words having fuel rods which are shifted out of the center points of the equal-sized meshes, or to provide the uniform fuel rod distribution with the constant standard spacing in an embodiment for different diameters. The standard spacing is understood in this case to mean the basic spacing of the rectangular basic pattern. In particular, this can be the conventional basic spacing (for instance, 12.6 or 12.7 or 14.3 mm). Through the selection of different outside diameters of the fuel rods, the local output can be reduced to approximately the standardized mean value in the vicinity of the guide tube filled with the moderator and optionally in the vicinity of the instrumentation tube. This makes the output distribution in the fuel assembly more uniform.

In other parts of the fuel assembly cross section, the option of unequal distribution of the fuel rods also enables finer local matching to the standardized mean value of the output generation in the fuel assembly.

Through the use of the above-described embodiment with different spacings of the fuel rods at and/or near the edge of the fuel assembly, the local moderation increased there, thus improving fuel utilization. Moreover, in a pressurized water reactor, this construction enables reduction of the pressure loss that occurs in the moderator (that is, coolant) as it flows through the fuel assemblies. With this construction that reduces the pressure loss, problems in terms of hydraulic compatibility, for instance of fuel assemblies having Zirkaloy spacers and Inconel spacers, are also solved. The improved cooling of the fuel rods at the edge of the fuel assembly resulting from the increase in the flow cross section at that location also reduces cladding tube corrosion.

These provisions homogenize the moderator distribution in the fuel assembly and thus achieve particularly good fuel utilization. On the other hand, hot spots and cladding tube corrosion of the fuel rods are lessened. There are fuel assemblies in which even when the measures according to the invention are taken, the fuel weight is to be kept constant once it is great enough, and there are fuel assemblies in which when making taking the measures according to the invention, the fuel weight is to be increased because it is too low. In both types of fuel assembly, a reduction in hot spots and a lessening of cladding tube corrosion are attained. Negative economic effects, resulting from a reduction in the number of cycles and an increase in the specific fuel assembly manufacturing costs (from the use of different pellet diameters and/or fuel rod diameters) can be largely compensated for by the high fuel weight in the fuel assembly.

In accordance with another feature of the invention, some of the meshes including all of the four meshes immediately adjacent each given inner mesh with a guide tube, contain fuel rods with a larger outside diameter than a fuel rod in an edge mesh, and/or the meshes including all of the four meshes immediately adjacent each given inner mesh with a guide tube, contain fuel rods with a central axis being closer to the guide tube than the center of the at least one mesh.

In accordance with a further feature of the invention, all of the fuel rods in the edge meshes have cladding tubes with a smaller outside diameter than a fuel rod in the at least one mesh immediately adjacent a given inner mesh containing a guide tube.

In accordance with an added feature of the invention, the cladding tube of the fuel rods in inner meshes adjoining edge meshes but not adjacent a given inner mesh containing a guide tube, have a smaller diameter than the cladding tubes of the fuel rods in the at least one mesh immediately adjacent a given inner mesh containing a guide tube.

In accordance with an additional feature of the invention, all of the fuel rods having a smaller diameter have the same small diameter, and all of the other fuel rods have the same larger diameter.

In accordance with yet another feature of the invention, some of the fuel rods have central axes which intersect center points of the meshes in which they are disposed and which are spaced apart by a given standard spacing, and at least one of two fuel rods disposed in an edge mesh and in an inner mesh immediately adjacent thereto have central axes which are spaced from the center points of the meshes in which they are disposed and which are spaced apart by a spacing which is greater than the given standard spacing.

In accordance with yet a further feature of the invention, adjacent fuel rods have central axes being mutually spaced apart by equal spacings in a uniform distribution.

In accordance with yet an added feature of the invention, the cladding tubes of the fuel rods have equal outside diameters, and the fuel rods are non-uniformly distributed.

In accordance with yet an additional feature of the invention, at least one of the fuel rods has a different ratio of cladding tube wall thickness to cladding tube outside diameter than another of the fuel rods. With this further feature, the weight of the fuel (such as uranium) in the fuel assembly can likewise be increased, with the positive economic effects referred to above. In addition, with the reduction in cladding tube material in the fuel assembly that this makes possible, and the associated improvement in neutron economy, an improvement in overall economy is likewise attained.

The invention is particularly advantageous with the use of fuel assemblies having plutonium uranium mixed oxide fuel. This is because mixed oxide fuel assemblies of this kind normally have a particularly inhomogenous output distribution over the cross section thereof.

With the objects of the invention in view, there is also provided a fuel assembly comprising a grid-like spacer having a rectangular and preferable square spacer cross section and having square spacer meshes formed therein with corners, sides and equal areas, the meshes having center points defined by intersecting diagonal lines each passing through two of the corners, a bundle of mutually parallel fuel rods with central axes and cladding tubes containing nuclear fuel, a bundle interior, a fuel bundle edge, and guide tubes disposed in the bundle interior, the fuel rods and the guide tubes each having a circular cross section and each being guided through a respective mesh, a first fuel rod group having a number Z1 of the fuel rods, the central axes of the fuel rods of the first fuel rod group passing through the center points of the meshes in which the fuel rods are disposed, a second fuel rod group having a number Z2 of the fuel rods, the central axes of the fuel rods of the second fuel rod group passing outside of the center points of the meshes in which the fuel rods are disposed, $Z1+Z2>0$, and if $Z2=0$, the first fuel rod group includes a first fuel rod guided through a spacer mesh with a side adjoining a mesh through which one of the guide tubes is guided, and the first fuel rod group includes a second fuel rod with a cladding tube having a smaller diameter than the cladding tube of the first fuel rod, and the second fuel rod is disposed at the bundle edge.

It is therefore seen that the fuel rods disposed in the center of the meshes can be combined into a first fuel rod group, while the fuel rods that are offset can be combined into a second fuel rod group.

Accordingly, in order to attain the object of the invention, a suitably selected unequal distribution of the fuel rods then already suffices. In other words, the desired effect is achieved by the fuel rods of the second group. As mentioned above, not even a single fuel rod of the first group need be present in the fuel assembly. In other words, the number Z1 of fuel rods of the first group can equal 0.

As a rule it will be necessary, at least in a mesh directly adjoining a mesh that contains a guide tube, to shift the fuel rod toward the guide tube with respect to the center point of the mesh.

In some cases, however, the object can be attained satisfactorily by simply providing fuel rods of the first group. In that case, the number Z2 of fuel rods of the second group can be selected to be equal to 0. In that situation, in at least one mesh directly adjacent an inner mesh containing a guide tube, the outside diameter of the cladding tube is selected to be larger than the outside diameter of a fuel rod at the edge of the cladding tube.

In accordance with again another feature of the invention, Z1 and Z2 are both at least equal to 1, and all of the fuel rods of the first fuel rod group have equal outside diameters.

In accordance with again a further feature of the invention, all of the fuel rods of the second fuel rod group have equal outside diameters.

In accordance with again an added feature of the invention, all of the fuel rods have equal outside diameters.

In accordance with again an additional feature of the invention, Z1 and Z2 are both at least equal to 1, and the fuel rods of the second fuel rod group have different outside diameters than the fuel rods of the first fuel rod group.

In accordance with still another feature of the invention, the fuel rods of the second fuel rod group have different diameters.

In accordance with still a further feature of the invention, the fuel rods of the second fuel rod group are guided in the meshes at the bundle edge.

In accordance with still an added feature of the invention, the fuel rods of the second fuel rod group are guided in the meshes at the bundle edge and have smaller outside diameters than the fuel rods of the first fuel rod group.

In accordance with still an additional feature of the invention, the fuel rods guided in the meshes at the bundle edge have cladding tubes with lesser wall thickness than the cladding tubes of others of the fuel rods.

In accordance with a concomitant feature of the invention, the fuel rods of the second fuel rod group are guided in the meshes adjacent the meshes in which the guide tube are disposed.

Other features which are considered as characteristic for the invention are set forth in the appended claims.

Although the invention is illustrated and described herein as embodied in a fuel assembly for a pressurized water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 3:
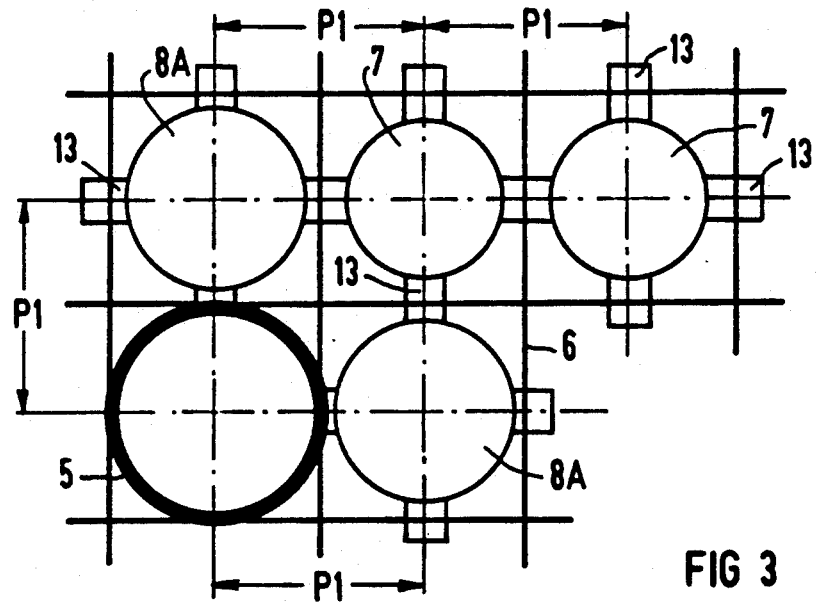
FIG. 3 is a further enlarged cross-sectional view of a portion of the fuel assembly of the embodiment of FIG. 2, having a larger cladding tube outside diameter for the fuel rods in the immediate vicinity of a guide tube (or instrumentation tube or moderator rod) in comparison with fuel rods located farther away.
Figure 4:
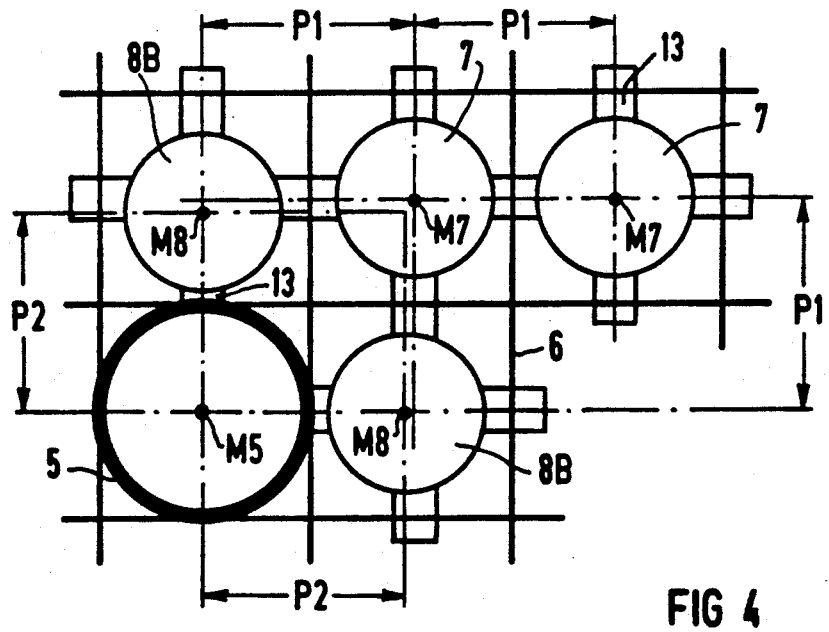
Figure 5:
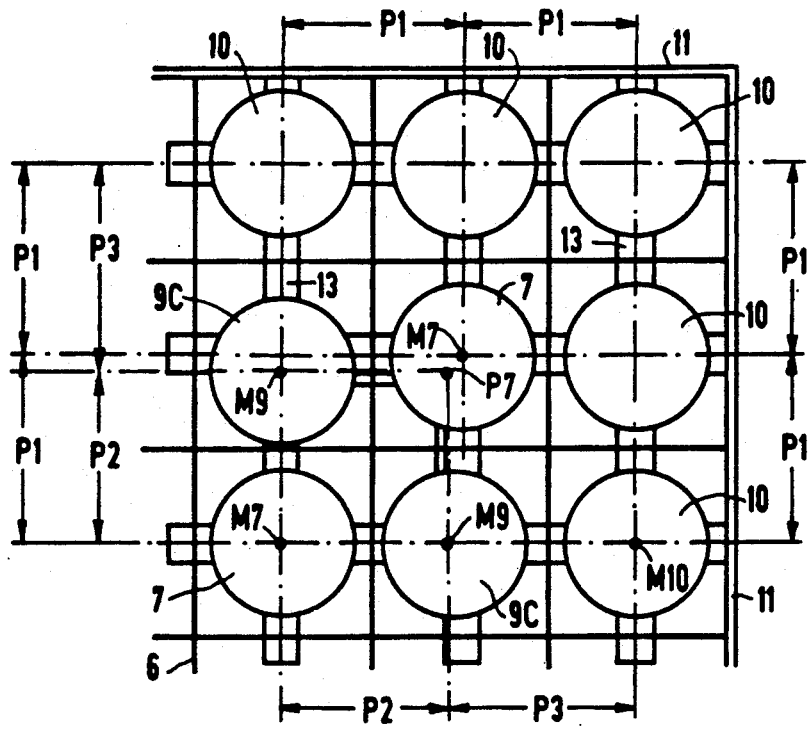
Figure 6:
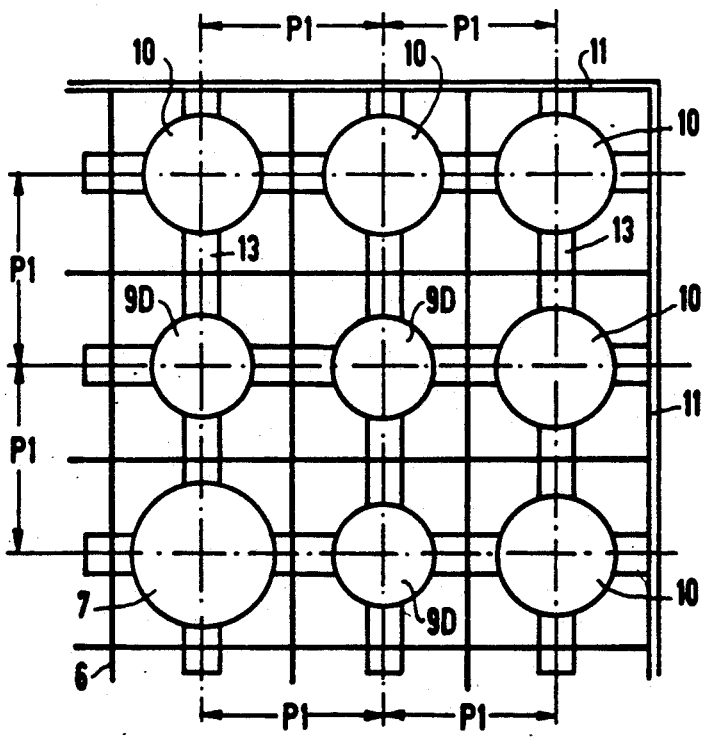
Figure 7:
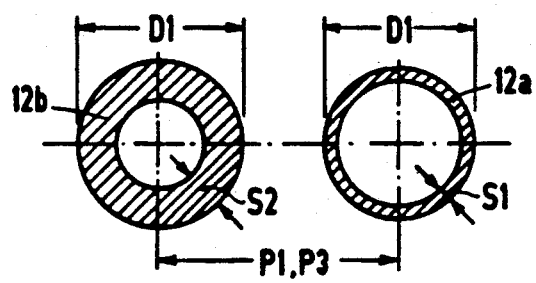
Figure 8:
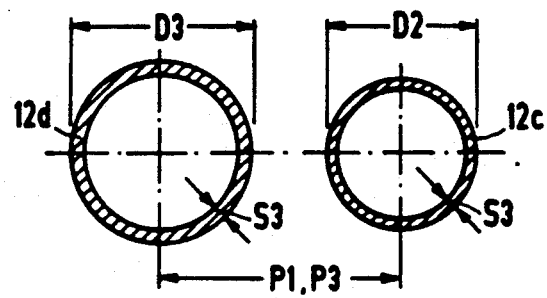
Figure 9:
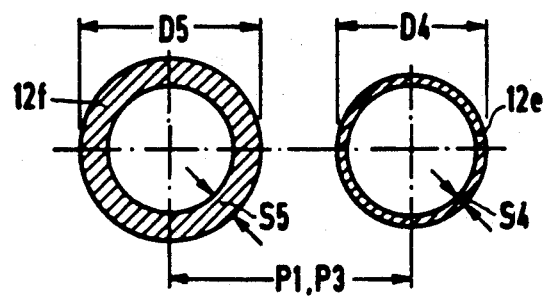
Figure 10:
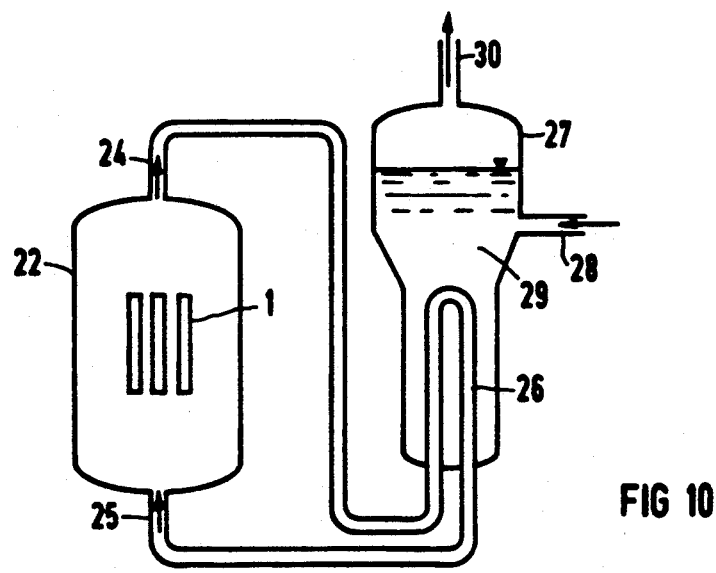

FIG. 4 is a view similar to FIG. 3 showing the cross section of a second embodiment of a fuel assembly, with a specified spacing between the cross-sectional centers of a guide tube (or instrumentation tube or moderator rod) and two fuel rods immediately adjacent thereto, the spacing being less than the spacing (standard spacing) between the cross-sectional centers of fuel rods that are farther away;

FIG. 5 is a cross-sectional view of a portion of a third embodiment of a fuel assembly at the corner of the fuel assembly, having a predetermined spacing between the cross-sectional centers of one row of edge fuel rods and the fuel rods of the next row of fuel rods located farther inward, this spacing being greater than the spacing (standard spacing) of the rows of fuel rods that are located even farther inward;

FIG. 6 is a view similar to FIG. 5 of a portion of a fourth embodiment of a fuel assembly at the corner of the fuel assembly, having fuel rods of smaller cross section as compared with the other standard fuel rods;

FIGS. 7–9 are each cross-sectional views of adjacent fuel rods having a different ratio between the wall thickness and the outside diameter of the cladding tube; and FIG. 10 is a schematic circuit diagram of a pressurized water reactor in which fuel assemblies and distributions of the fuel assemblies as shown in FIGS. 1–9 can be used.

Figure 1:
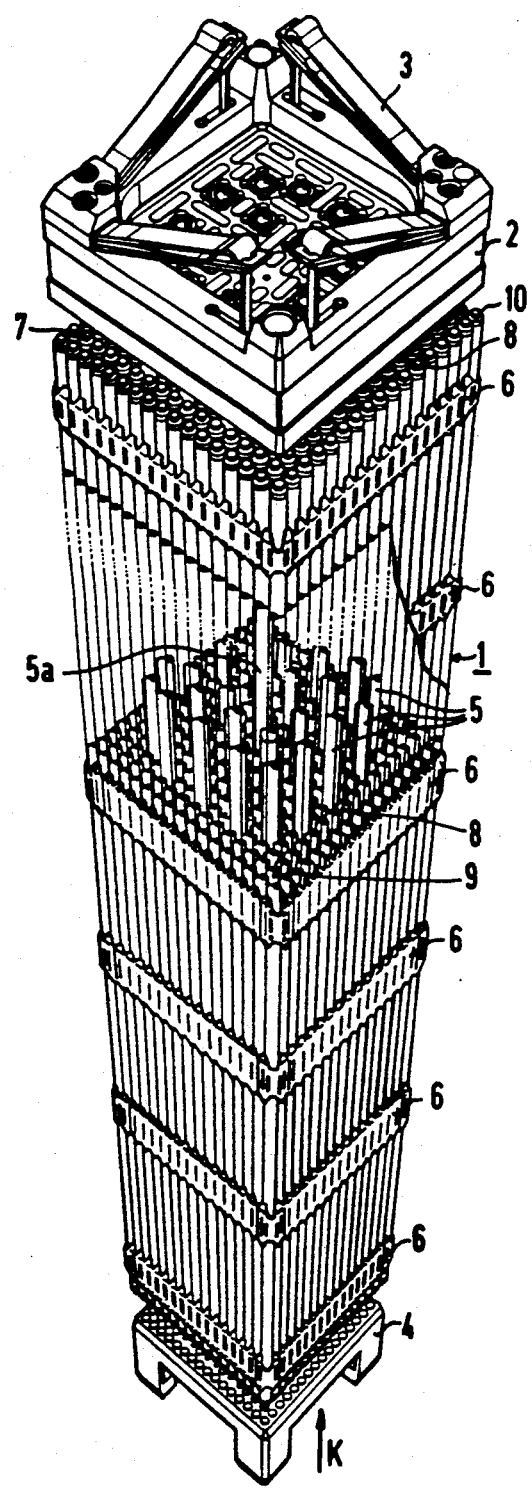
FIG. 1 is a fragmentary, diagrammatic, perspective view of a fuel assembly for a pressurized water reactor.
Figure 2:
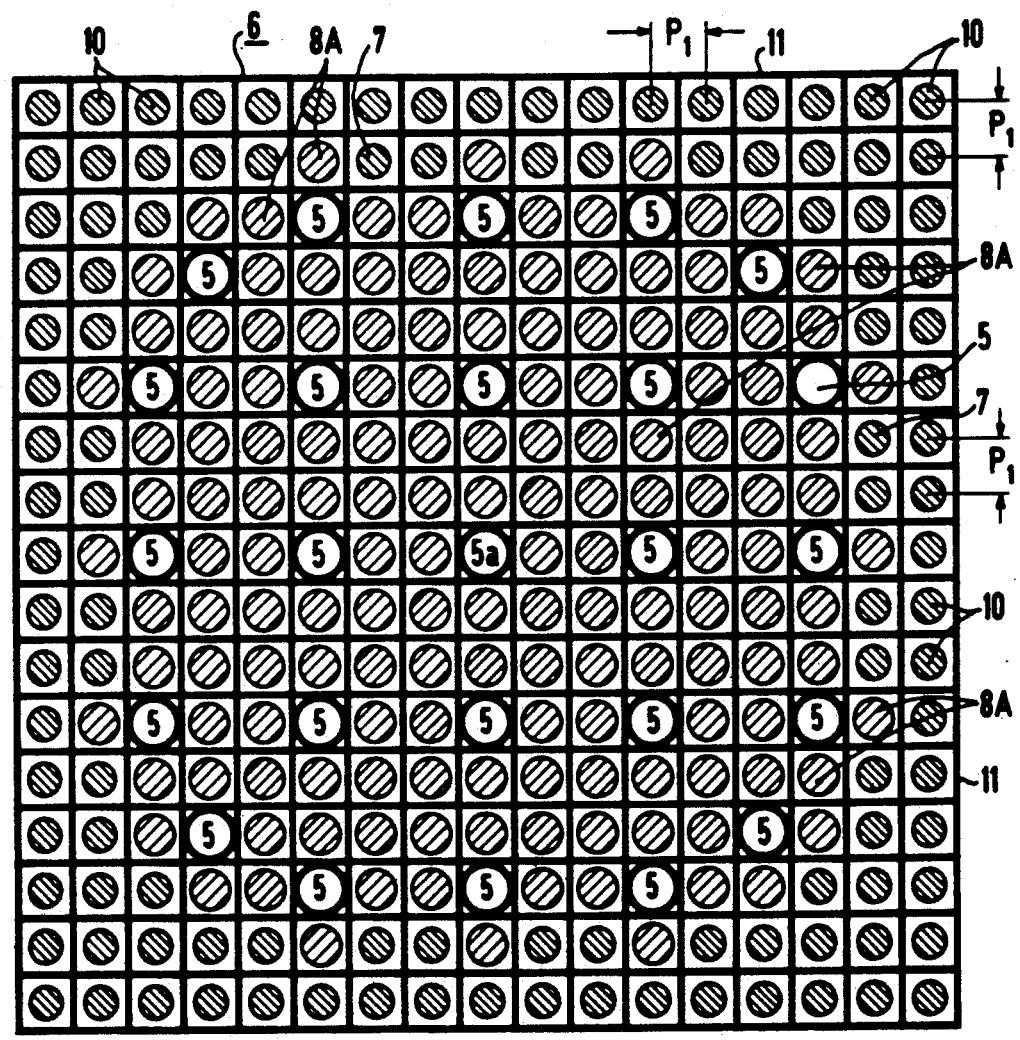
FIG. 2 is an enlarged cross-sectional view of a complete fuel assembly according to a first embodiment of the invention.

Referring now to the figures of the drawing in detail and first, particularly, to FIG. 1 thereof, there is seen a 17×17 fuel assembly 1, which includes a fuel assembly head 2 with holding-down springs 3, a fuel assembly foot 4, a number of guide tubes 5 (in this case the number n equals 24), an instrumentation tube 5a, square grid-like spacers 6, and round fuel rods 7, 8, 9 and 10, which are filled with fuel in the form of cylindrical pellets. Edge fuel rods located at the edge or edge leg 11 shown in FIG. 2, are identified by reference numeral 10. The fuel rods 7, 8, 9 and 10 are conventionally disposed in a grid configuration with a strictly square cross section, or in other words in a specified equal distribution. As will become clear below, in at least one embodiment of the invention, a departure from this strictly square grid configuration is made. The possible structural difference between the fuel rods 7–10 will be explained later. The fuel rods 7 may be conventional standard fuel rods, for example.

As a rule, in a reactor core, a given number of fuel assemblies 1 which are identical to one another, are provided. The fuel assemblies are disposed in a reactor pressure vessel and a coolant K flows through them from bottom to top, as indicated by an arrow. The fuel rods 7, 8, 9, 10 of the fuel assembly 1 are retained in a support structure, which is formed of the fuel assembly head 2, provided with the four holding-down springs 3, the fuel assembly foot 4, the guide tubes 5 inbetween four non-illustrated control rods and the central instrumentation tube 5a, depending on the fuel assembly type. The grid-like spacers 6 which have a square spacer cross section and meshes or openings of equal area, are secured to the guide tubes 5. Each of the fuel rods 7, 8, 9, 10 is guided through one respective mesh, and the grid-like spacers 6 combine the fuel rods into a bundle and hold them in such a way that they can freely expand axially. The laterally open construction of the fuel assembly 1 enables a crosswise mixing of the coolant K and makes for uniform heating of the coolant.

FIG. 2 shows a complete cross section of a grid-like spacer 6 of a fuel assembly 1 of FIG. 1, as an example of a pressurized water reactor having 17×17=289 grid meshes. The fuel assembly 1 has 264 fuel rods with reference numerals 7, 8A and 10, twenty-four symmetrically distributed guide tubes 5, and one central instrumentation tube 5a. The drawing only shows fuel rods 7, 8A, 10 with the same mutual spacing P1 among the cross-sectional points, both in the longitudinal and the transverse direction of the grid (making a uniform distribution in a square basic configuration). For instance, the spacing P1 can be 12.6 mm. In other words, the spacing is basic to the grid, throughout the grid, and can be considered a standard spacing.

For the sake of particularly good economical utilization of the nuclear fuel (for instance, uranium oxide, or in particular uranium plutonium mixed oxide), at least one fuel rod 8A (shown with shading inclined from the lower left to the upper right) in the immediate vicinity of a guide tube 5 and/or of the instrumentation tube 5A, should have a cladding tube with an outside diameter of 9.5 mm or 9.7 mm, for instance, which is larger than that of a fuel rod located farther away from the guide and instrumentation tubes 5, 5a. The thinner fuel rods which are located farther away from the guide and instrumentation tubes 5, 5a (with the shading inclined from the lower right to the upper left), are predominantly identified by reference numeral 7. In FIG. 5, the preferred case is shown, where all of the immediately adjacent fuel rods have the larger diameter, while all of the edge or peripheral meshes containing the edge fuel rods 10 and all of the other meshes adjoining the edge meshes contain thinner fuel rods.

The group identified as "fuel rods located farther away" includes predominantly the four rows of edge fuel rods 10. The outside diameter of the cladding tubes of the fuel rods 7 located farther away is 9.14 or 9.30 mm, for example. In this exemplary embodiment, all of the fuel rods 7 located farther away, or in other words all those with shading oriented from the lower right to the upper left have a smaller diameter than the fuel rods 8A immediately adjacent the tubes 5, 5a. The group of "fuel rods 7 located farther away" can also predominantly (fully or partly) include the four adjacent fuel rods 7 located diagonally away. This depends on the desired uniformity.

Accordingly, this exemplary embodiment also shows that the fuel rods 10 at the edge of the fuel assembly 1 have an outside diameter of the cladding tube of 9.14 or 9.30 mm, for instance, which is also smaller than all of the fuel rods 8A in the center of the fuel assembly 1. This center can be defined by the (almost circular) circumferential line described by the outer guide tubes 5.

In FIG. 3, a portion of a fuel assembly cross section as seen from above is shown, in accordance with the first exemplary embodiment of FIG. 2. The fragmentary or detail view again shows the region in the fuel assembly 1 around a guide tube (or instrumentation tube 5a), but on a larger scale. It can be seen clearly in this case that the two fuel rods 8A shown immediately adjacent the guide tube 5 (or instrumentation tube 5a), have a larger outside diameter of the cladding tube than the fuel rods 7 located farther away from the tube 5 (or 5a). In a departure from the drawing, the fuel rod 7 located diagonally to the right from the tube 5 could also have a larger outside diameter of its cladding tube. Correspondingly, the two non-illustrated fuel rods 8A located to the left of and below the guide tube 5 could have a larger diameter than the fuel rods 7. As a result of this dimensioning of the four fuel rods 8A, more fuel can be accommodated in the fuel rods 8A near the tube 5, given an increased pellet diameter and the same wall thickness, for example, than in the fuel rod 7. As a result, the previously excessive local moderation in the region around the tube 5 (or 5a) is reduced. The dimensioning of the fuel rods 8A assures the uniform utilization of fuel over the cross section. The adjacent fuel rods 7 and/or 8A, located in a crosswise or lengthwise row, have spacings P1 of the cross-sectional centers or central axes thereof which are equal to one another. In other words, the center points or central axes of the fuel rods 7, 8A of each vertical or horizontal row are located along a straight line. Button and spring combinations for retaining the fuel rods 7, 8A in the various meshes are shown in this case at reference numeral 13.

FIG. 4 shows a portion of a second embodiment of a fuel assembly cross section as seen from above. The second embodiment of the fuel assembly 1 is only insignificantly more difficult to manufacture than the embodiment of FIG. 3. Once again, particularly good utilization of the nuclear fuel is attained. The fragmentary or detail view shows an enlargement in the region of the fuel assembly 1 around a guide tube 5 (or instrumentation tube 5a). It can be seen that all of the fuel rods 7, 8B in this case are selected to have the same diameter. They preferably contain the same quantity of nuclear fuel, or in other words the same number of pellets of the same size. However, different weights are once again possible.

It can also be seen that in this case the spacing P2 between a cross-sectional center point or point along the central axis M8 of the two fuel rods 8B that are immediately adjacent to and in the same row direction as the guide tube 5 (or instrumentation tube 5b) on one hand, and the cross-sectional center point M5 of the guide tube 5 (or instrumentation tube 5a) on the other hand is less than the standard spacing P1 of the cross-sectional center points M7 of (adjacent) fuel rods 7 located farther away. In other words P1 is larger than P2. The fuel rods 8B in this case are accordingly shifted closer to the tube 5, 5a.

Accordingly, in the vicinity of the tubes 5, 5a a "nonuniform" distribution is obtained. In other words, the centers of the fuel rods and the guide rods describe the intersection points of a grid that is not uniform like the grid of the spacer but rather is deformed in the vicinity of the tubes 5, 5a, in order to assure that the moderation is made uniform in this case. The spacings P1, P2 are once again measured in the row direction.

It should also be noted that the fuel rod 7 located in the diagonal direction can also be shifted closer to the tubes 5, 5a. This is also true for the three other non-illustrated adjacent fuel rods 7 in the diagonal direction.

FIG. 5 shows a portion of a third embodiment of the corner of a fuel assembly cross section as seen from above. In this case a spacing P3 between the cross-sectional centers M9 of some fuel rods 9C in the second row and the cross-sectional center M10 of the adjacent fuel rod 10 at the edge of the fuel assembly (that is, on the edge or edge leg 11 of the spacer) is greater than the spacing P1, P2 of the inner fuel rods 7, 9C. That is, P3>P1>P2, and P3=2P1−P2. The fuel rods 7, 9C, 10 all have the same outside diameter. In other words, in FIG. 5 the fuel rods 9C of the second row in each case are shifted away from the adjacent edge fuel rod 10. Although it is not illustrated in FIG. 5, the fuel rod 7 in the second row can be shifted away from one or both adjacent fuel rods 10 of the edge row. In other words, the cross-sectional center M7 of the fuel rod 7 (shifted diagonally inward) can be located at the point P7. The diameters of all of the fuel rods 7, 9C, 10 are equal and the fuel rods can be standard fuel rods. Due to this construction, uniformity of the hot spots and a local increase in fuel utilization are also assured in the vicinity of the edges 11.

In FIGS. 4 and 5, the "unshifted" fuel rods 7 or the fuel rods 7 and 10 form a first group, and the "shifted" fuel rods 8B or 9C form a second group.

FIG. 6 shows how this result can be assured in a different way as well. In this case, each of the fuel rods 10 of the edge row has a smaller outside diameter than a fuel rod 7 located farther inward, which for instance is a standard fuel rod. Thus with the same cladding tube wall thickness, they contain less fuel. Moreover, the fuel rods 9D of the second row are again thinner than the fuel rods 7, which as noted above can, for instance, be standard fuel rods. Differing from the drawing, in this case, the fuel rods 9D and 10 can preferentially have the same outside diameter in order to reduce the number of types of fuel rods and thus keep manufacturing costs low. The spacings P1 between all of the adjacent fuel rods 7, 9D and 10 are equal. The effect of the construction chosen in FIG. 6 is equivalent to that of the construction chosen for FIG. 5, if the spacings P2, P3 are suitably selected in FIG. 5.

FIG. 7 shows two adjacent fuel rods 12a and 12b having cladding tubes with the same outside diameter D1, in which one fuel rod 12a has a different ratio s1/D1 of its cladding tube wall thickness s1 to its cladding tube outside diameter D1 than the adjacent fuel rod 12b. The ratio s2/D2 is larger than s1/D1. The fuel rod 12a can therefore hold more fuel than the fuel rod 12b.

FIG. 8 shows two adjacent fuel rods 12c, 12d with cladding tubes having different outside diameters D2 and D3 (D3 is larger than D2). It is assumed in this case that the wall thickness s3 is the same for the cladding tubes of both fuel rods 12c, 12d. Accordingly the following applies to the ratios: s3/D2>s3/D3. In this case, the fuel rod 12d can hold more fuel than the fuel rod 12c.

FIG. 9 shows two adjacent fuel rods 12e and 12f, where the relationship between the outside diameters D4 and D5 of their cladding tubes are such that D4 is smaller than D5, while the relationship of their cladding tube wall thicknesses s4 and s5 are such that s4<s5. The dimensioning is selected in such a way that the following applies: s4/D4=s5/D5. This assures mechanical stability. In this case, the fuel rod 12e can contain more fuel than the fuel rod 12f.

As shown in FIG. 10, a pressurized water reactor has a pressure vessel 22, in which a reactor core with diagrammatically illustrated nuclear reactor fuel assemblies 1 is located. The fuel assemblies have fuel rods in accordance with an exemplary embodiment as described above.

An outlet 24 for water (both coolant and moderator) from the pressure vessel 22 and thus from the reactor core having the nuclear reactor fuel assemblies 1, is connected to one end of a primary tube 26 of a steam generator 27. An inlet 25 for leading the water into the pressure vessel 22 and thus into the reactor core is connected to the other end of the primary tube 26. The primary loop formed by the pressure vessel 22 and the primary tube 26 is a closed loop, so that no steam can form in this primary loop and thus in the reactor core. Steam does form on the secondary side of the steam generator 27, which has a delivery connection 28 for feedwater 29 and an outlet connection 30 for steam. The steam may, for instance, be carried from the outlet connection 30 to a non-illustrated steam turbine.

What is claimed is:

1. Fuel assembly for a pressurized water reactor, comprising:
    a) fuel assembly edges, and a fuel assembly interior,
    b) a bundle of mutually parallel fuel rods with cladding tubes each having a periphery and containing nuclear fuel, and a given number of guide tubes for control rods;
    c) a support structure including an upper end with a fuel assembly head, a lower end with a fuel assembly foot, and a plurality of spacers disposed perpendicular to said fuel rods, said spacers having a uniform grid structure with edge meshes formed therein at said fuel assembly edges and inner meshes formed therein in said fuel assembly interior, each of said inner meshes being surrounded by four respective immediately adjacent meshes each having essentially the same area and each containing a respective one of said tubes; and
    d) whereby, for each of said inner meshes containing a guide tube, at least one of said respective immediately adjacent meshes contains a fuel rod in which the spacing of the cladding tube periphery from said inner mesh containing said guide tube is smaller than the spacing of the cladding tube periphery of a fuel rod in an edge mesh from an inner mesh immediately adjacent said edge mesh.

2. Fuel assembly according to claim 1, wherein said cladding tube of said fuel rod in said at least one mesh immediately adjacent said given inner mesh with a guide tube, has a larger outside diameter than a fuel rod in an edge mesh.

3. Fuel assembly according to claim 1, wherein said cladding tube of said fuel rod in said at least one mesh immediately adjacent said given inner mesh with a guide tube, has a central axis being closer to said guide tube than the center of said at least one mesh.

4. Fuel assembly according to claim 1, including at least one instrumentation tube disposed in one of said meshes.

5. Fuel assembly according to claim 1, wherein some of said meshes including all of said four meshes immediately adjacent each given inner mesh with a guide tue, contain fuel rods with a larger outside diameter than a fuel rod in an edge mesh, and some of said meshes including all of said four meshes immediately adjacent each given inner mesh with a guide tube, contain fuel rods with a central axis being closer to said guide tube than the center of said at least one mesh.

6. Fuel assembly according to claim 2, wherein all of said fuel rods in said edge meshes having cladding tubes with a smaller outside diameter than a fuel rod in said at least one mesh immediately adjacent a given inner mesh containing a guide tube.

7. Fuel assembly according to claim 6, wherein said cladding tubes of said fuel rods in inner meshes adjoining edge meshes but not adjacent a given inner mesh containing a guide tube, have a smaller diameter than said cladding tubes of said fuel rods in said at least one mesh immediately adjacent a given inner mesh containing a guide tube.

8. Fuel assembly according to claim 7, wherein all of said fuel rods having a smaller diameter have the same small diameter, and all of the other fuel rods have the same larger diameter.

9. Fuel assembly according to claim 1, wherein some of said fuel rods have central axes which intersect center points of said meshes in which they are disposed and which are spaced apart by a given standard spacing, and at least one of two fuel rods disposed in an edge mesh and in an inner mesh immediately adjacent thereto have central axes which are spaced from the center points of said meshes in which they are disposed and which are spaced apart by a spacing which is greater than said given standard spacing.

10. Fuel assembly according to claim 1, wherein adjacent fuel rods have central axes being mutually spaced apart by equal spacings in a uniform distribution.

11. Fuel assembly according to claim 5, wherein said cladding tubes of said fuel rods have equal outside diameters, and said fuel rods are non-uniformly distributed.

12. Fuel assembly according to claim 9, wherein said cladding tubes of said fuel rods have equal outside diameters, and said fuel rods are non-uniformly distributed.

13. Fuel assembly according to claim 1, wherein at least one of said fuel rods has a different ratio of cladding tube wall thickness to cladding tube outside diameter than another of said fuel rods.

14. Fuel assembly comprising:
    a) a grid-like spacer having a square spacer cross section and having square spacer meshes formed therein with corners, sides and equal areas, said meshes having center points defined by intersecting diagonal lines each passing through two of said corners,
    b) a bundle of mutually parallel fuel rods with central axes and cladding tubes containing nuclear fuel, a bundle interior, a fuel bundle edge, and guide tubes disposed in said bundle interior, said fuel rods and said guide tubes each having a circular cross section and each being guided through a respective mesh,
    c) a first fuel rod group having a number $Z1$ of said fuel rods, said central axes of said fuel rods of said first fuel rod group passing through said center points of said meshes in which said fuel rods are disposed,
    d) a second fuel rod group having a number $Z2$ of said fuel rods, said central axes of said fuel rods of said second fuel rod group passing outside of said center points of said meshes in which said fuel rods are disposed,
    e) $Z1+Z2>0$, and
    f) if $Z2=0$, i) said first fuel rod group includes a first fuel rod guided through a spacer mesh with a side adjoining a mesh through which one of said guide tubes is guided, and
ii) said first fuel rod group includes a second fuel rod with a cladding tube having a smaller diameter than said cladding tube of said first fuel rod, and said second fuel rod is disposed at said bundle edge.

15. Fuel assembly comprising:
a) a grid-like spacer having a rectangular spacer cross section and having square spacer meshes formed therein with corners, sides and equal areas, said meshes having center points defined by intersecting diagonal lines each passing through two of said corners,
b) a bundle of mutually parallel fuel rods with central axes and cladding tubes containing nuclear fuel, a bundle interior, a fuel bundle edge, and guide tubes disposed in said bundle interior, said fuel rods and said guide tubes each having a circular cross section and each being guided through a respective mesh,
c) a first fuel rod group of fuel rods all having equal outside diameters and having a number Z1 of said fuel rods, said central axes of said fuel rods of said first fuel rod group passing through said center points of said meshes in which said fuel rods are disposed,
d) a second fuel rod group having a number Z2 of said fuel rods, said central axes of said fuel rods of said second fuel rod group passing outside of said center points of said meshes in which said fuel rods are disposed, and
e) wherein Z1 and Z2 are both at least equal to 1.

16. Fuel assembly comprising:
a) a grid-like spacer having a rectangular spacer cross section and having square spacer meshes formed therein with corners, sides and equal areas, said meshes having center points defined by intersecting diagonal lines each passing through two of said corners,
b) a bundle of mutually parallel fuel rods with central axes and cladding tubes containing nuclear fuel, a bundle interior, a fuel bundle edge, and guide tubes disposed in said bundle interior, said fuel rods and said guide tubes each having a circular cross section and each being guided through a respective mesh,
c) a first fuel rod group having a number Z1 of said fuel rods, said central axes of said fuel rods of said first fuel rod group passing through said center points of said meshes in which said fuel rods are disposed,
d) a second fuel rod group of fuel rods all having equal outside diameters and having a number Z2 of said fuel rods, said central axes of said fuel rods of said second fuel rod group passing outside of said center points of said meshes in which said fuel rods are disposed,
e) wherein Z1 and Z2 are both at least equal to 1, and
f) said fuel rods of said second fuel rod group having different outside diameters than said fuel rods of said first fuel rod group.

* * * * *